(12) United States Patent
Katsumata et al.

(10) Patent No.: US 6,923,060 B2
(45) Date of Patent: Aug. 2, 2005

(54) CAPACITIVE-TYPE ACCELERATION SENSOR

(75) Inventors: Takashi Katsumata, Kariya (JP); Toshiya Ikezawa, Kariya (JP); Tomohito Kunda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/631,775

(22) Filed: Aug. 1, 2003

(65) Prior Publication Data

US 2004/0020291 A1 Feb. 5, 2004

(30) Foreign Application Priority Data

Aug. 2, 2002 (JP) ........................................ 2002-225701

(51) Int. Cl.[7] ............................................. G01P 15/125
(52) U.S. Cl. ...................................... 73/514.32; 73/493
(58) Field of Search ........................ 73/514.32, 514.36, 73/514.38, 493, 497; 361/280

(56) References Cited

U.S. PATENT DOCUMENTS

| 5,150,616 | A | | 9/1992 | Kondo et al. |
| 5,483,106 | A | * | 1/1996 | Echigo et al. ............... 257/783 |
| 5,686,711 | A | | 11/1997 | Yamamoto |
| 6,448,624 | B1 | | 9/2002 | Ishio et al. |
| 6,591,678 | B2 | * | 7/2003 | Sakai ....................... 73/514.32 |

FOREIGN PATENT DOCUMENTS

| JP | A-2001-302924 | 10/2001 |
| JP | A-2002-323514 | 11/2002 |

* cited by examiner

Primary Examiner—John E. Chapman
(74) Attorney, Agent, or Firm—Posz Law Group, PLC

(57) ABSTRACT

A capacitive-type acceleration sensor includes a sensor chip that forms a moving electrode and a fixed electrode. The electrodes face each other while maintaining a detection gap. The sensor chip is joined to a circuit chip integrally. The circuit chip is mounted on a package via a resin adhesive. The adhesive is mixed with a filler of a material having a Young's modulus higher than that of the resin.

3 Claims, 3 Drawing Sheets

CAPACITIVE-TYPE ACCELERATION SENSOR

CROSS REFERENCE TO RELATED APPLICATION

This application is based on and incorporates herein by reference Japanese Patent Application No. 2002-225701 filed on Aug. 2, 2002.

FIELD OF THE INVENTION

This invention relates to a capacitive-type acceleration sensor equipped with a sensor chip that has a moving electrode and a fixed electrode.

BACKGROUND OF THE INVENTION

A capacitive-type acceleration sensor is equipped with a sensor chip having a moving electrode and a fixed electrode formed in an opposing manner on a semiconductor substrate maintaining a detection gap. When acceleration is applied in this sensor chip, the moving electrode and the fixed electrode vibrate relative to each other, whereby the opposing distance between the two electrodes varies. The acceleration that is applied is detected based upon a change in the capacitance between the two electrodes accompanying the variation in the distance.

In the acceleration sensor of this type, it is proposed to join a sensor chip and a circuit chip having a function such as processing the sensor output, and attach these two chips onto a package such as of ceramics via a resin adhesive.

When the acceleration is applied in this proposed structure, however, the adhesive works as a spring and the assembled structure on the adhesive resonates, whereby the vibration affects the vibration of the moving and fixed electrodes in the sensor chip, i.e., affects the vibration of the sensing unit.

FIG. 4 is a diagram schematically illustrating vibration frequency characteristic in the proposed capacitive-type acceleration sensor, wherein the abscissa represents the frequency f and the ordinate represents the resonance magnification K with which the vibration is amplified by the sensing unit and by the adhesive. FIG. 5 is a diagram schematically illustrating a relationship between the vibration frequency f and the amplitude magnification K of vibration in the sensor.

In this proposed sensor, the sensing unit in the sensor chip has a predetermined resonance frequency fa, and the resonance frequency characteristic of the sensing unit is represented by a curve A in FIG. 4. The resonance frequency fa of the sensing unit is utilized to determine the frequency used for the measurement, i.e., to determine the range of frequencies Rf to be measured.

The external G is the external acceleration applied to the sensor from the outer side. The external acceleration is applied to the sensor as vibration of a magnification of 1. When the vibration system is not resonating with the adhesive as a spring, the external acceleration is amplified based on the vibration frequency characteristic of the sensing unit. In this instance, desired output characteristic is defined as represented by a solid-line curve L1 in FIG. 5.

When a general resin adhesive is used, however, the resonance frequency fb of the vibration system with the adhesive as a spring approaches the resonance frequency fa of the sensing unit as represented by a curve B in FIG. 4.

Therefore, even if external acceleration is applied as vibration of the magnification of 1, an amplified vibration of external acceleration due to the resonance of the vibration system with the adhesive as a spring is given to the assembly structure, i.e., given to the sensor chip and to the circuit chip.

Thus, the sensing unit detects an acceleration that is greater than an external acceleration that is really applied. As a result, as represented by a broken-line curve L2 in FIG. 5, there is produced a sensor output greater than the external acceleration that is really applied, and an output error occurs relative to the desired output characteristic L1.

Thus, the output error increases as the resonance frequency fb of the vibration system with the adhesive as a spring approaches the resonance frequency fa of the sensing unit.

SUMMARY OF THE INVENTION

In view of the above problems, therefore, it is an object of the present invention to improve a capacitive-type acceleration sensor in which a sensor chip forming a moving electrode and a fixed electrode is joined to a circuit chip integrally together, and the circuit chip is mounted on a package via a resin adhesive. Specifically it is an object to suppress an error in the sensor output caused by the amplification of vibration of the sensing unit due to the resonance of the vibration system with the adhesive as a spring.

The present invention is based on inventor's findings that that the resonance frequency of the vibration system with the adhesive as a spring increases with an increase in the rigidity of the resin adhesive, i.e., increases with an increase in the Young's modulus of the adhesive, and can be separated away from the resonance frequency of the sensing unit.

According to the present invention, a capacitive-type acceleration sensor has a sensor chip forming a moving electrode and a fixed electrode facing each other while maintaining a detection gap. This sensor chip is joined to a circuit chip integrally together, and the circuit chip is mounted on a package via a resin adhesive. The adhesive is mixed with a filler of a material having a Young's modulus higher than that of the resin.

With the adhesive being mixed with a filler of a material having a Young's modulus higher than that of the resin, then, the Young's modulus can be increased in the adhesive as a whole.

Namely, as shown in FIG. 6A, the resonance frequency fb of the vibration system with the adhesive as a spring can be increased so as to be separated away from the resonance frequency fa of the sensing unit. It is thus made possible to suppress an error in the sensor output caused by the amplification of vibration of the sensing unit stemming from the resonance of the vibration system with the adhesive as a spring.

Namely, as shown in FIG. 6B, the amplitude magnification of vibration of the sensing unit represented by a broken-line curve approaches the desired output characteristic represented by a solid-line curve to suppress an error in the sensor output.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
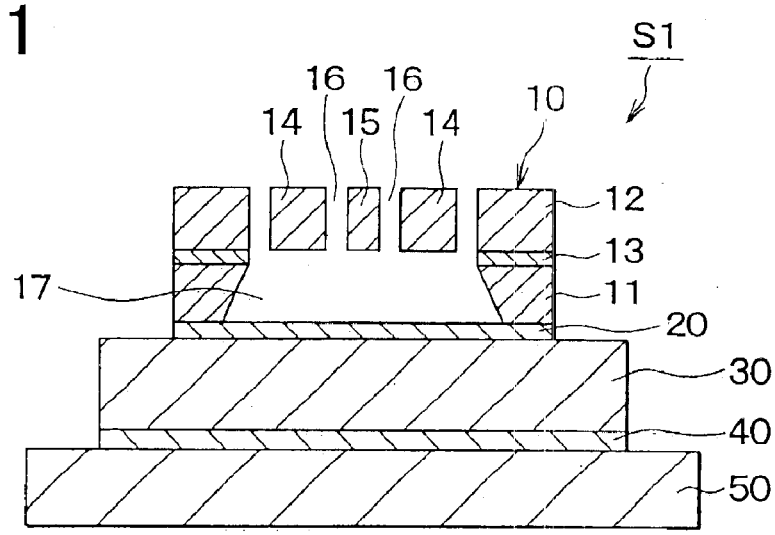
FIG. 1 is a sectional view schematically illustrating a capacitive-type acceleration sensor according to an embodiment of the present invention.

Referring to FIG. 1, a capacitive-type acceleration sensor S1 has a sensor chip 10 formed of a semiconductor substrate such as of silicon by way of a known semiconductor process. This sensor S1 uses an SOI (silicon-on-insulator) substrate obtained by joining a second silicon substrate 12 onto a first silicon substrate 11 via an oxide film 13.

In the sensor chip 10 of this embodiment, grooves are formed in the second silicon substrate 12 to sectionalize the moving electrodes 14 and the fixed electrodes 15 via the grooves. The moving and fixed electrodes 14 and 15, respectively, may be formed in a well-known comb teeth-like beam structure.

Detection gaps 16 are maintained between the moving electrodes 14 and the fixed electrodes 15; i.e., the two electrodes 14 and 15 are facing each other via the detection gap 16, and a detection capacitance is formed between the detection gaps 14 and 15.

When the acceleration is applied, therefore, the two electrodes 14 and 15 vibrate relative to each other, whereby the opposing distance between the two electrodes 14 and 15 or the detection gap 16 varies, and the applied acceleration is detected based upon a change in the capacitance between the two electrodes 14 and 15 caused by a variation in the distance. Thus, the moving and fixed electrodes 14 and 15 are constituted as a sensing unit.

In the sensor chip 10, further, the first silicon substrate 11 and the oxide film 13 are removed from the portions corresponding to the moving and fixed electrodes 14 and 15, thereby to form a cavity 17. The moving and fixed electrodes 14, 15 are liberated in an upper part of the cavity 17 so as to vibrate relative to each other.

In the sensor chip 10 of this embodiment, for example, grooves are formed from, the surface of the second silicon substrate 12 by trench etching to define the moving and fixed electrodes 14 and 15, while the cavity 17 is formed from the side of the first silicon substrate 11 by anisotropic etching of silicon.

The sensor chip 10 is joined to the circuit chip 30 via an adhesive film 20 having a high rigidity. The circuit chip 30 has a function to process the output signals from the sensor chip 10 and to send them to an external unit, and is made of a semiconductor substrate such as silicon. The adhesive film 20 may be a dicing tape of a resin used for dice-cutting.

The circuit chip 30 to which the sensor chip 10 is integrally joined is mounted on a package 50 via a resin adhesive 40. Here, the adhesive 40 is applied and cured to accomplish the adhesion. The package 50 is made of ceramics and is mounted on a body to be measured, such as an automobile.

When the acceleration is applied to the capacitive-type acceleration sensor S1, a change occurs in the capacitance in the sensing unit, i.e., between the moving and fixed electrodes 14 and 15, and the applied acceleration is detected based upon the change in the capacitance. Here, vibration occurs with the adhesive 40 as a spring and with the assembled structure including the circuit chip 30 and the sensor chip 10 as a mass unit.

In order to prevent the vibration of the moving and fixed electrodes 14 and 15 from being amplified by the resonance of the vibration system with the adhesive as a spring according to this embodiment, the adhesive 40 is mixed with filler of a material having a Young's modulus larger than that of the resin.

The filler are used for the following reasons. In the vibration system with the adhesive 40 as a spring, it has been known that the resonance frequency fb of the assembled structure (10, 30) which is the mass unit (i) varies in proportion to the one-half power of the area of adhesion of the adhesive 40, (ii) varies in proportion to the two-thirds power of the thickness of the adhesive agent 40, and (iii) varies in proportion to the one-half power of the Young's modulus E of the adhesive 40.

Figure 2:
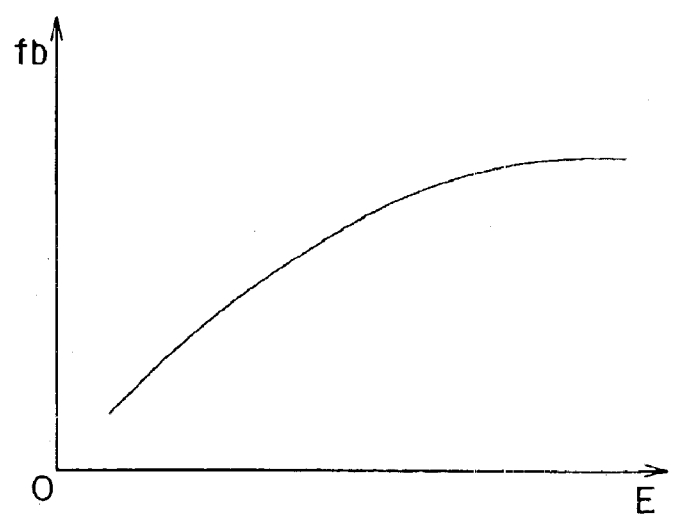
FIG. 2 is a graph schematically illustrating a relationship between the Young's modulus of the adhesive and the resonance frequency of the embodiment.

Among them, the above (i) and (ii) face relatively much limitation from the standpoint of the shape and size of the sensor and maintaining the adhesion strength. It is therefore contrived to increase the Young's modulus E of the adhesive agent 40. FIG. 2 is a diagram schematically illustrating a relationship between the Young's modulus E of the adhesive 40 and the resonance frequency fb of the assembled structure (10, 30). As understood from FIG. 2, the resonance frequency fb of the assembled structure increases with an increase in the Young's modulus E of the adhesive agent.

Figure 4:
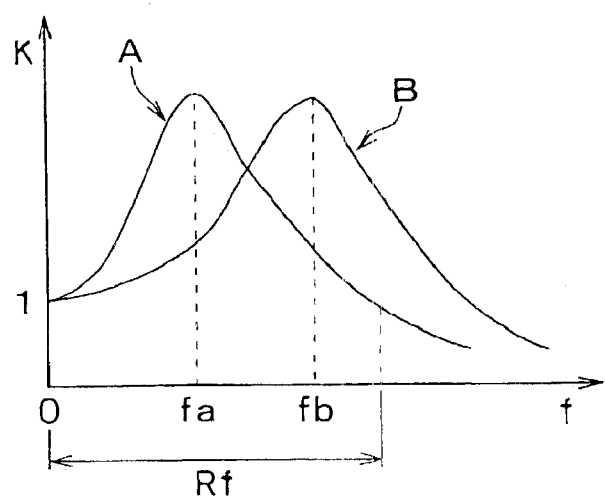
FIG. 4 is a graph schematically illustrating vibration frequency characteristic of a capacitive-type acceleration sensor.

As shown in FIG. 4, the resonance frequency of the assembled structure is normally close to the resonance frequency fa of the moving and fixed electrodes 14, 15. In this embodiment, however, the resonance frequency fb of the assembled structure is increased by increasing the Young's modulus E of the adhesive in order to separate the two resonance frequencies fa and fb away from each other.

If the adhesive 40 is mixed with filler of a material having a Young's modulus higher than that of the resin of the adhesive, then, the Young's modulus of the adhesive 40 as a whole can be increased.

Therefore, since the resonance frequency fb of the vibration system with the adhesive 40 as a spring can be increased to be more away from the resonance frequency fa of the fixed and moving electrodes 14 and 15, the amplification of vibration of the moving and fixed electrodes 14 and 15 caused by the resonance of the vibration system with the adhesive 40 as a spring can be suppressed.

Figure 5:
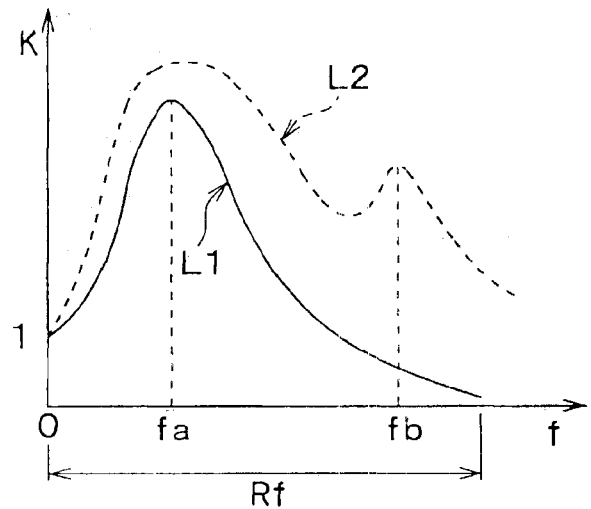
FIG. 5 is a graph schematically illustrating a relationship between the vibration frequency and the amplitude magnification of vibration in a capacitive-type acceleration sensor.
Figure 6A:
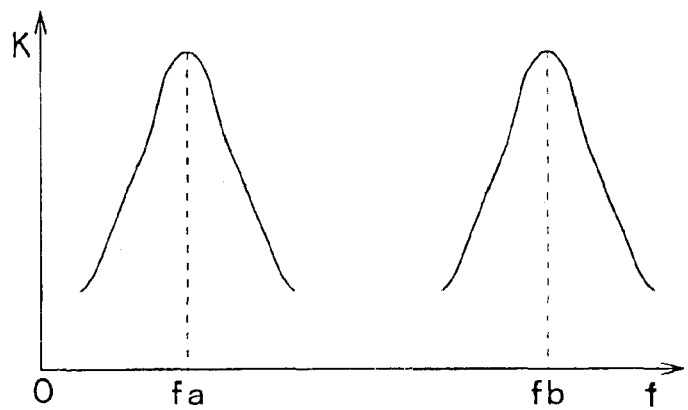
FIGS. 6A and 6B are graphs illustrating the effect of the embodiment.
Figure 6B:
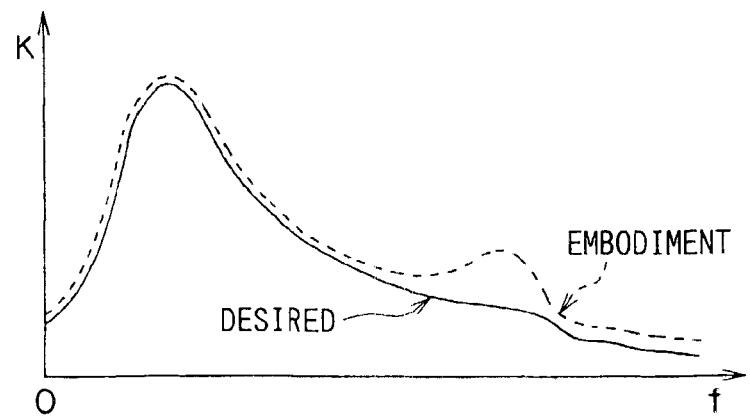

Thus, an error in the sensor output is suppressed. Namely, the embodiment makes it possible to obtain output characteristic closer to the desired output characteristic represented by the solid-line curve L1 in FIG. 5. By separating the two resonance frequencies fa and fb away from each other, the amplitude magnification K of vibration in the sensing unit of the embodiment can be brought close to the desired output characteristic represented by the solid-line curve, and an error in the sensor output can be suppressed as illustrated in FIG. 6B.

In the adhesive 40 mixed with filler of a material having a Young's modulus higher than that of the resin of the adhesive, an epoxy resin can be used as the resin, and a metal or a glass can be used as the filler or, more specifically, silver filler can be used. The weight ratio of the filler can be selected to be, for example, about several tens of-percent.

It is, of course, allowable to increase the Young's modulus of the adhesive 40 by varying the molecular weight by changing the degree of polymerization of the resin in the adhesive 40.

Figure 3A:
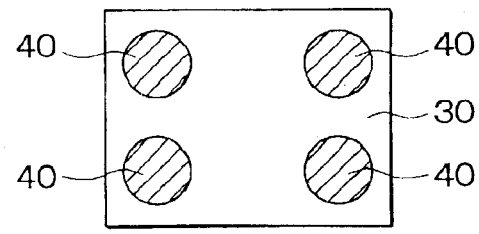
FIGS. 3A to 3C are diagrams illustrating various patterns for arranging adhesives in the embodiment.
Figure 3B:
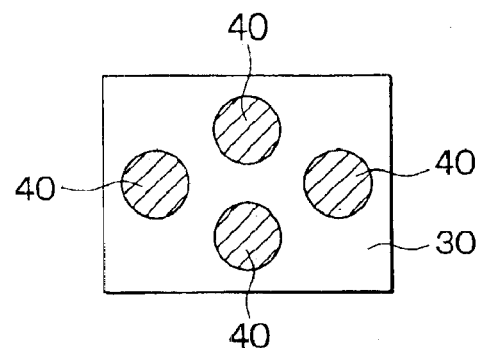
Figure 3C:
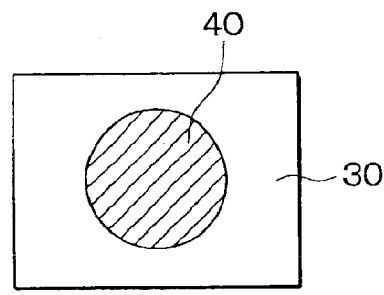

As the patterns for arranging the adhesive 40, various patterns are proposed. The adhesives 40 may be arranged at four corners on the circuit chip 30 as shown in FIG. 3A. The adhesives 40 may be arranged in a crossing manner as shown in FIG. 3B. The adhesive 40 may be arranged on the circuit chip 30 at one central point as shown in FIG. 3C.

Among these patterns, the adhesion at four corners or the adhesion in a crossing manner encounters such a difficulty that the corner portions of the circuit chip 30 or of the sensor chip 10 undergo a displacement due to the thermal stress caused by a change in the temperature, and the sensor chip 10 is deformed to a large extent. With the central one-point adhesion, on the other hand, the corners of the circuit chip 30 are liberated from the package 50 and, hence, the deformation of the sensor chip 10 by the thermal stress is small.

When the sensor chip 10 deforms due to the thermal stress, the opposing area between the moving electrode 14 and the fixed electrode 15 fluctuates to adversely affect the temperature characteristic of the sensor. In this regard, it is desired that the adhesive 40 is arranged at the central portion of the circuit chip 30 like the central one-point adhesion.

In arranging the adhesive 40, it may often be difficult to apply the adhesive 40 in compliance with the pattern. In such a case, the adhesion surfaces of the circuit chip 30 or of the package 50 may be formed rugged to realize any adhesion pattern.

The present invention should not be limited to the disclosed embodiment, but may be implemented in many other ways without departing from the spirit of the invention.

What is claimed is:

1. A capacitive acceleration sensor comprising:
    a sensor chip forming a moving electrode and a fixed electrode facing each other while maintaining a detection gap;
    a circuit chip joined to the sensor chip integrally;
    a package; and
    an adhesive provided to attach the circuit chip to the package,
    wherein:
        the adhesive is a mixture of resin and filler mixed with the resin and having a Young's modulus higher than that of the resin;
        the filler includes one of a metal and a glass; and
        the adhesive is arranged at only a central portion of the circuit chip.

2. A capacitive acceleration sensor according to claim 1, wherein the filler includes silver.

3. A capacitive acceleration sensor comprising:
    a sensor chip having a moving electrode and a fixed electrode facing each other and a detection gap therebetween;
    a circuit chip integrally joined with the sensor chip;
    a package; and
    an adhesive attaching the circuit chip to the package,
    wherein:
        the adhesive includes a mixture of a resin and a filler, the filler having a Young's modulus higher than that of the resin; and
        the adhesive is arranged at only a central portion of the circuit chip.

* * * * *